United States Patent [19]

Ackermann

[11] Patent Number: 4,703,605
[45] Date of Patent: Nov. 3, 1987

[54] BALE, BALING PRESS AND METHOD OF BALING

[75] Inventor: Gustav Ackermann, Harsewinkel, Fed. Rep. of Germany

[73] Assignee: Claas OHG, Harsewinkel, Fed. Rep. of Germany

[21] Appl. No.: 818,820

[22] Filed: Jan. 14, 1986

Related U.S. Application Data

[62] Division of Ser. No. 758,546, Jul. 24, 1985.

[30] Foreign Application Priority Data

Aug. 8, 1984 [DE] Fed. Rep. of Germany ....... 3429203

[51] Int. Cl.$^4$ .............................................. B65B 13/02
[52] U.S. Cl. ...................................... 53/176; 53/118; 53/211; 53/587; 53/472
[58] Field of Search ................. 53/118, 211, 176, 449, 53/587, 430, 472; 206/83.5, 204; 150/52 R

[56] References Cited

U.S. PATENT DOCUMENTS

| | | | |
|---|---|---|---|
| 443,620 | 12/1890 | Orr | 206/835 |
| 1,394,266 | 10/1921 | Angier | 53/176 |
| 2,082,114 | 6/1937 | Littlefield | 53/176 X |
| 2,705,557 | 4/1955 | Hartman | 206/83.5 |
| 3,019,573 | 2/1962 | Navikas | 53/211 X |
| 4,248,343 | 2/1981 | Schaffer | 206/83.5 |
| 4,409,784 | 10/1983 | Van Gin Hover | 53/118 |
| 4,569,439 | 2/1986 | Freye | 206/83.5 |
| 4,580,398 | 4/1986 | Bruer | 53/118 X |

Primary Examiner—John Sipos
Attorney, Agent, or Firm—Michael J. Striker

[57] ABSTRACT

Substantially round bales of agricultural products are formed so that they have a bale core composed of agricultural products, and a wrapping including a shape-retaining wrapping web material completely surrounding the circumference of the bale core, and a water-impermeable wrapping web material extending over at least a portion of the circumference of the bale core and protecting the same from rains and/or soil moisture.

2 Claims, 3 Drawing Figures

BALE, BALING PRESS AND METHOD OF BALING

This is a division, of application Ser. No. 758,546, filed July 24, 1985 pending.

BACKGROUND OF THE INVENTION

The present invention relates to substantially round or rolled bales of agricultural stack products, as well as to a baling press and a method of baling.

Bales are known in the art in which a bale core composed of agricultural products is completely surrounded over its circumference by a shape-retaining wrapping web of a net material which adheres to itself or in some cases to the passing agricultural stack material. This is disclosed, for example, in the Cerman Offenlegungsschrift No. 3,227,160. When such bales are stored outside, it has been recognized that they become partially wet under the action of rain, particularly during long free land storage. It is to be understood that this is very undesirable for the agricultural product bales.

SUMMARY OF THE INVENTION

Accordingly, it is an object of the present invention to provide a bale which avoids the disadvantages of the prior art, and also a baling press and a method of baling of such bales.

In keeping with these objects and with others which will become apparent hereinafter, one feature of the present invention resides, briefly stated, in a substantially round or rolled bale in which in addition to the shape-retaining wrapping web composed for example of a net material and wrapping completely the circumference of the bale, an additional water-impermeable wrapping web is provided which at least partially wraps the circumference of the bale.

When the bale formed in accordance with the present invention is laid on the ground with its water-impermeable wrapping web facing upwardly, the water-impermeable wrapping web forms a quasi roof for the bale.

Another feature of the present invention is a baling press and a method of baling, in accordance with which the the inventive bales can be formed so as to have the above-mentioned additional water-impermeable wrapping web over at least a portion of the circumference of the bale.

In accordance with still another feature of the present invention, the water-impermeable wrapping web lies between the shape-retaining, net material web an the bale or more particularly the bale core. This has the advantage that the additional wrapping web is firmly fixed on the bale without additional measures such as glueing, welding and the like.

In accordance with a further advantageous feature of the present invention, the water-impermeable wrapping web and the additional wrapping web are fixedly connected with one another.

The baling press in accordance with the present invention includes means for forming a bale core, means for wrapping completely the circumference of the bale core with a shape-retaining wrapping web, and means for additionally wrapping at least a portion of the circumference of the bale core with a water-impermeable wrapping web.

When the wrapping has the shape-retaining wrapping web and the water-impermeable wrapping web fixedly connected with one another, only one wrapping web holding device, as well as only one length measuring and separating device can be provided in the baling press.

The same advantage is achieved when in accordance with still another feature of the present invention, the shape-retaining web and the additional water-impermeable web are formed as a one piece web. This can be achieved by providing a foil web which has alternating regions including first regions provided with cutouts formed for example by punching-out, and second regions without the cutouts and therefore formed water-impermeable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
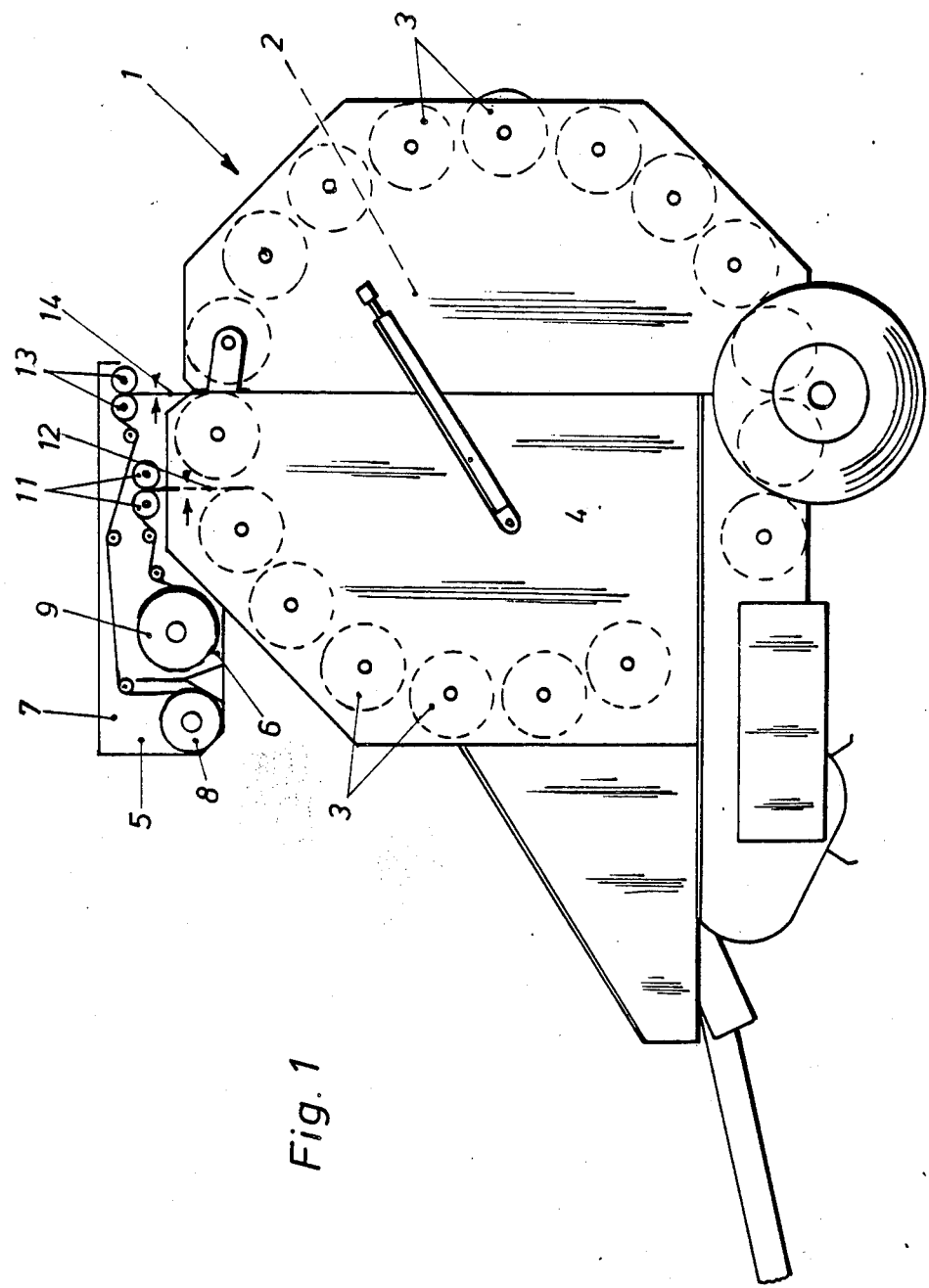
FIG. 1 is a side view of a baling press for forming bales of agricultural products in accordance with the present invention.
Figure 2:
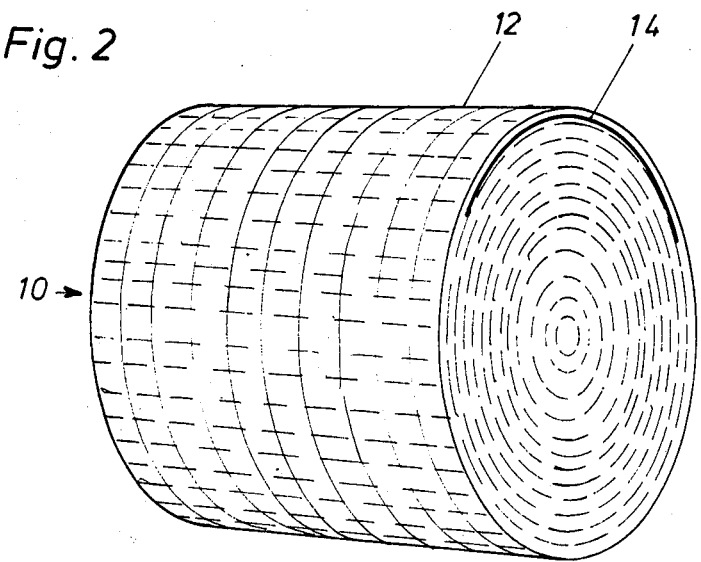
FIG. 2 is a perspective view of a bale of the present invention, in accordance with one embodiment.
Figure 3:
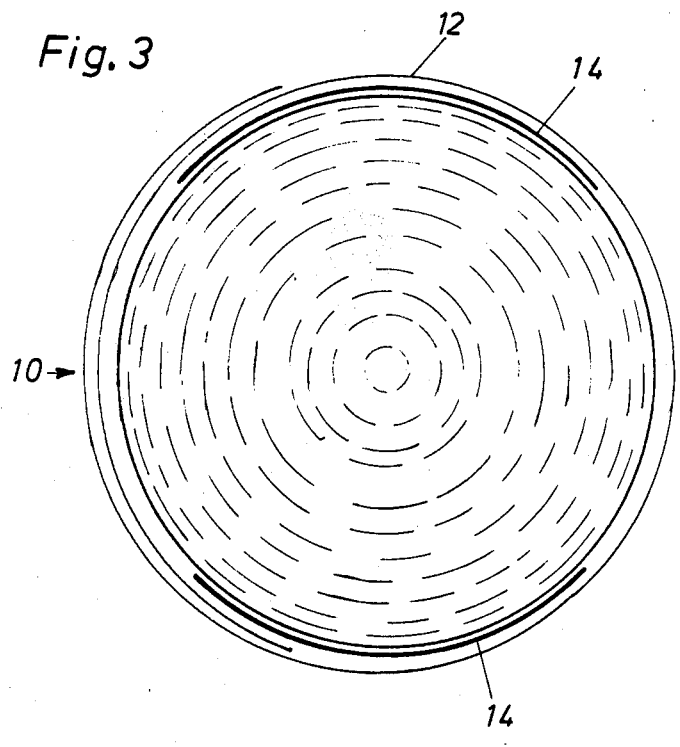
FIG. 3 is an enlarged front view of the inventive bale, in accordance with another embodiment of the invention.

FIGS. 2 and 3 shows a round or rolled bale formed in accordance with the present invention. FIG. 1 shows a baling press which produces the bales and is designed in accordance with the present invention.

The baling press has a known construction and is identified as a whole with reference numeral 1. The baling press has a pressing chamber 2 with a periphery which is limited by winding rollers 3 and with lateral sides which are limited by walls 4. The winding rollers 3 are driven and supported in the walls 4.

A wrapping device is located above the pressing chamber 2 and fixedly connected with the side walls 4. It has a trough 7 which is subdivided into two receiving chambers 5 and 6. A roll of foil 8 is arranged in the receiving chamber 5, while a roll of net 9 is accommodated in the receiving chamber 6.

When an agricultural product is supplied into the pressing chamber 2, a bale 10 is formed in the latter. After the formation of the bale 10, a net material web 12 is first pulled from the net roller 9 by means of pulling rollers 11. The net material web 12 is introduced into the pressing chamber 2 and entrained by the bale 10. When at least a half of the bale is wrapped by the net material web 12, a foil material web 14 is pulled from the foil roller 8 by pulling rollers 13 and is also introduced from above into the pressing chamber 2. The foil material web 14 is also entrained by the bale 10 and moves between the bale 10 and the net material web 12.

When the foil material web 14 wraps a predetermined portion of the bale 10, it is cut off so that during further rotation of the bale 10 it is wrapped only by the net material web. After complete wrapping of the bale by the net material web with the addition of an overlapping length, the net material web is cut off under the pulling rollers 11. Then the finished bale is expelled from the baling press in known manner. Since the length measuring devices and the cutting devices for both material webs are known, they are not described here in detail.

The bale shown in FIG. 2 is wrapped around by the net material 12 and has one foil material web 14 partially wrapping the bale. The bale shown in FIG. 3 is also wrapped around by the net material web 12, but in contrast to the bale in FIG. 2, has two foil material web pieces 14 which partially surround two portions of the periphery of the bale. The bale shown in FIG. 3, has the advantage that when it is deposited on the field, it is protected in its lower region from soil moisture, and is also protected in its upper region from rains.

In the case of the bales with only one foil web material piece shown in FIG. 2, piling of the bales can be performed in such a manner that in the lower layers of the pile the water-impermeable foil material web 14 faces downwardly to protect the pile from soil moisture, while in the upper layers the foil material web faces upwardly to protect the pile from rain.

It will be understood that each of the elements described above, or two or more together, may also find a useful application in other types of constructions differing from the types described above.

While the invention has been illustrated and described as embodied in a round bale, a baling press and a method of baling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A baling press for making substantially round bales of agricultural products, comprising: means forming substantially round bale cores composed of agricultural products and having an outer circumferences; means for wrapping the bale core with a shape-retaining wrapping web material; means for wrapping the bale core with a water-impermeable wrapping web material; length measuring means arranged to measure the length of each of said wrapping web materials and cutting means arranged to cut off the respective lengths of each of said wrapping web materials, said length measuring means and said cutting means including a first length measuring device and a first cutting device associated with said first-mentioned wrapping means, and a second length measuring device and a second cutting device associated with said second mentioned wrapping means, and operating so as to cut said wrapping web materials so that said shape-retaining web material completely surrounds the circumference of the ball core, while said water-impermeable wrapping web materials surrounds only a portion of the circumference of the bale core, said bale core forming means has a pressing chamber with a horizontal center axis, said first-mentioned wrapping means including a first supply roller provided with the shape-retaining wrapping web material and having an axis which extends parallel to said central axis of said pressing chamber, said second mentioned wrapping means including a second roller provided with the water-impermeable wrapping web material and also having an axis which extends parallel to said central axis of said pressing chamber, said rollers being arranged to supply said wrapping web materials into the interior of said pressing chamber, holding means for holding said rollers and including a first holding element which supports said first roller and a second holding element which support said second roller, said holding means includes a trough having an inner space and a partition subdividing said inner space of said trough into two receiving chambers each receiving a respective one of said rollers and forming a respective one of said holding means, said trough has a horizontally extending bottom, said chambers being arranged one after the other in a horizontal direction so that said rollers are arranged in said trough one after the other in said horizontal direction; and further comprising first guiding means for guiding the shape-retaining wrapping web material between said first roller and the interior of said pressing chamber and second guiding means for guiding the water-impermeable wrapping web material between said second roller and the interior of said pressing chamber, said first and second guiding means being formed so as to deviate said web materials first from said rollers upwardly and substantially parallel to one another, then horizontally above one another and substantially parallel to one another, and then downwardly and substantially parallel to one another into said pressing chamber at two locations spaced from one another.

2. A baling press for making substantially round bales of agricultural products, comprising: means forming substantially round bale cores composed of agricultural products and having an outer circumferences: means for wrapping the bale core with a shape-retaining wrapping web material; means for wrapping the bale core with a water-impermeable wrapping web material; length measuring means arranged to measure the length of each of said wrapping web materials; and cutting means arranged to cut off the respective lengths of each of said wrapping web materials, said length measuring means and said cutting means including a first length measuring device and a first cutting device associated with said first-mentioned wrapping means, and a second length measuring device and a second cutting device associated with said second mentioned wrapping means, and operation so as to cut said wrapping web materials so that said shape-retaining web material completely surrounds the circumference of the bale core, while said water-impermeable wrapping web material surrounds only a portion of the circumference fo the bale core, said bale core forming means has a pressing chamber with a horizontal central axis and an upper limit, said first-mentioned wrapping means including a first supply roller provided with the shape-retaining wrapping web material and having an axis which extends parallel to said central axis of said pressing chamber, said second-mentioned wrapping means including a second roller provided with the water-impermeable wrapping web material and also having an axis which extends parallel to said central axis of said pressing chamber, said rollers being located one after the other in a horizontal direction and horizontally offset from said pressing chamber, and said rollers being also downwardly offset from said upper limit of said pressing chamber so as to reduce a total height of the baling press.

* * * * *